(12) United States Patent
Harris (10) Patent No.: US 7,221,438 B2
(45) Date of Patent: May 22, 2007

(54) COHERENT LASER RADAR APPARATUS

(75) Inventor: Michael Harris, Malvern (GB)

(73) Assignee: Qinetiq Limited (GB)

( * ) Notice: Subject to any disclaimer, the term of this patent is extended or adjusted under 35 U.S.C. 154(b) by 277 days.

(21) Appl. No.: 10/496,900

(22) PCT Filed: Nov. 25, 2002

(86) PCT No.: PCT/GB02/05279

§ 371 (c)(1),
(2), (4) Date: May 25, 2004

(87) PCT Pub. No.: WO03/048804

PCT Pub. Date: Jun. 12, 2003

(65) Prior Publication Data

US 2005/0002013 A1 Jan. 6, 2005

(30) Foreign Application Priority Data

Nov. 29, 2001 (GB) ................................. 0128588.1

(51) Int. Cl.
*G01P 3/36* (2006.01)
(52) U.S. Cl. ...................... 356/28.5; 356/5.01; 356/28
(58) Field of Classification Search ................ 356/28.5
See application file for complete search history.

(56) References Cited

U.S. PATENT DOCUMENTS 4,737,624 A    4/1988  Schwarte
5,048,951 A    9/1991  Combe et al.
5,172,181 A *  12/1992 Morbieu et al. ............ 356/28.5
5,587,785 A *  12/1996 Kato et al. ................. 356/28.5
5,781,283 A    7/1998  Damann et al.
5,835,199 A *  11/1998 Phillips et al. ............. 356/5.03

FOREIGN PATENT DOCUMENTS

JP    42 40 769      6/1994
WO    WO 02/25248    3/2002

OTHER PUBLICATIONS

Lockey et al., Multicomponent time-division-multiplexed optical fibre laser Doppler Anemometry, *IEE Proceedings: Optoelectronics, Institution of Electrical Engineers*, vol. 144, pp. 168-175 (1997).
MacFadyen et al., "Fibre-Optic Systems for Dynamic Light Scattering—A Review", *Optics and Laser Technology*, pp. 175-187 (1997).
International Search Report European Patent Office for Application No. PCT/GBB02/05279.

* cited by examiner

*Primary Examiner*—Thomas H. Tarcza
*Assistant Examiner*—Luke D. Ratcliffe
(74) *Attorney, Agent, or Firm*—McDonnell Boehnen Hulbert & Berghoff LLP (57) ABSTRACT

A coherent laser radar device is described which comprises a laser source (11), and two or more transceivers (84) are optically connected to the laser source by optical fiber cables (42, 48, 82) that are routed through an optical routing means (80). A detection means (27) is also provided, and radiation received by the two or more receivers (84) can also be optically coupled to the detection means (27) by optical fiber cables (82, 86, 90).

30 Claims, 5 Drawing Sheets

COHERENT LASER RADAR APPARATUS

This invention relates to coherent laser radar apparatus, and more particularly to low cost coherent laser radar apparatus for the determination of wind speed at a plurality of positions.

Coherent laser radar (CLR) systems have been developed over many years for wind speed measurements as well as for hard target measurements, such as ranging. The basic principle of CLR is to direct a laser beam to an object and to detect the returned signal. If the laser beam is frequency modulated, comparison of the phase of the emitted and detected signal provides range information. Also, any Doppler shift in the frequency of the detected signal will give information on the relative speed of the object. The part of a CLR system which transmits and receives radiation is termed the transceiver. The transceiver may have common or separate transmit and receive optics; such transceivers are termed mono-static and bi-static transceivers respectively.

Wind speed measurement techniques rely on the assumption that airborne particles will be moving at the same speed as the air in which they are suspended. Thus, wind speed may be determined by measuring the Doppler shift in laser light reflected from the particles passing through a particular volume of air. The particular volume is commonly termed the probe volume. Wind speed measurements of this type are presently used in aircraft to determine their relative air speed.

Although CLR devices can readily provide accurate wind speed measurements, the systems are typically bulky in size and are also costly to build, maintain and operate. For example, the 10.5 µm wavelength carbon dioxide laser generally requires water cooling and the associated 10.5 µm infra-red detector often needs to be gas cooled.

An alternative CLR system is described in Karlsson et al, Applied Optics, Vol. 39, No. 21, 20 Jul. 2000. The system described in Karlsson et al is an all fibre multifunction continuous wave CLR device which operates at a wavelength of 1.55 µm. Although such a device is less bulky than traditional systems, a laser diode and erbium doped optical amplifier are required. These components, although not requiring gas or liquid cooling, are relatively bulky and expensive.

A significant drawback of acquiring wind measurements using known CLR systems is that the measurement of wind speed can generally only be obtained for a single probe volume using a single CLR device. Typically, the measurement of wind speed in multiple probe volumes has required the use of multiple CLR devices. Although the simultaneous measurement of multiple probe volumes would prove advantageous in many applications (e.g. avionics), the provision of multiple CLR devices has been considered impractical due to cost, weight and size considerations.

U.S. Pat. No. 5,048,951 describes a device in which a single laser beam is sequentially directed along, and the return beam is detected from, two or more different directions. In particular, U.S. Pat. No. 5,048,951 describes an anemometer in which the, wind speed is measured in three orthogonal directions thereby providing the three components of the speed of an aircraft with respect to air.

This system of U.S. Pat. No. 5,048,951 overcomes to some extent the cost, size and weight problems associated with making wind speed measurement in multiple probe volumes. However, the total number of transmit/receive directions and the angular separation between each of these directions is limited by the compactness of the components of the optical system. An additional disadvantage of the system described in U.S. Pat. No. 5,048,951 is the requirement to maintain the various optical components in precise alignment. Also, the provision of a pair of rotating reflective disks to direct the radiation in different directions is prone to failure.

It is the object of this invention to mitigate at least some of the disadvantages described above.

According to a first aspect of the invention, a coherent laser radar device comprises a laser source, and two or more transceivers and is characterised in that the two or more transceivers are optically connected to the laser source by optical fibre cables, and the optical fibre cables connecting the laser source and the two or more transceivers are routed through a first optical routing means.

The provision of a single laser source coupled to two or more transceivers is (transceivers being apparatus for both transmitting and receiving radiation) by optical fibre cables has several advantages over prior art devices.

The optical fibre linkage allows the two or more transceivers to be located in positions that are remote to the laser source. For example, if the CLR device is deployed to measure wind speed each transceiver may be located at various positions along an aircraft wing or on two or more wind turbines.

The use of a single laser source coupled to the two or more transceiver heads through the first optical routing means also has advantages in terms of the cost, size and weight of the CLR device. For example, the provision of multiple prior art CLR devices on an aircraft to measure wind speed at multiple locations would not be practical due to the cost and weight of each device. However, a device according to the present invention could be used to measure the relative wind speed of multiple probe volumes.

Similarly, the present invention overcomes disadvantages of the devices of the type described in U.S. Pat. No. 5,048,951. For example, the transceivers of a device according to the present invention may be located in any position relative to the laser source and may be directed to probe volumes or objects in any direction relative to the laser source. This is an advantage over the type of device described in U.S. Pat. No. 5,048,951 in which the direction of the CLR measurements are limited by the physical configuration of the beam splitting apparatus.

Advantageously, the first optical routing means is a multi-way optical splitter. A multi-way optical splitter allows the optical power of the laser source to be split between the transceivers. Simultaneous measurement of range, or wind speed etc from the various transceiver heads is thus possible. The laser power available to each of the transceivers, and hence the strength of any received return signal, is the only limit on the number of transceivers that can be used in such a configuration.

Conveniently, the first optical routing means is an optical switch; the optical switch directing laser power to one transceiver at a time. The sequential direction of power to each transceiver in turn allows quasi-simultaneous measurements to be acquired. This type of quasi-simultaneous measurement is particularly suited to operation when the observed phenomena (e.g. wind speed, range etc) shows an evolution over time that is slower than the switching cycle time scale.

In a further embodiment the optical switch is a wavelength division multiplexer (WDM), the WDM being arranged so as to direct laser radiation of different wavelength to different transceivers.

Tuning the output wavelength of laser radiation from the radiation source causes the WDM to direct the radiation to a particular transceiver. The WDM, which may be a dense WDM (DWDM), has no moving or mechanical parts and is thus physically robust.

Advantageously, the optical switch is an optical fibre switch that is controlled to direct laser radiation to a particular transceiver head. Electronically controlled optical fibre switches are commercially available, and allow radiation to be routed to a particular transceiver as required.

In a further embodiment a single detector is provided, and the radiation received by the two or more transceivers is optically coupled to the detector by optical fibre cables via a second optical routing means. In other words, the second optical routing means allows the return signal from one of the two or more transceivers to be directed to the detector. A person skilled in the art would recognise the type of detector appropriate for detecting the returned laser signal.

Conveniently, the second optical routing means is an optical switch such as a WDM, and the frequency of the laser source is alterable such that radiation received by a particular transceiver head is directed to the detector.

The use of a WDM, or more preferably a DWDM, as the second optical routing means would be particularly suited to configurations where laser radiation is provided to, and transmitted by, all transceivers; wavelength tuning of the laser output being used to select the transceiver for which received radiation is to be detected.

Advantageously, the optical switch is a fibre switch that is controlled such that radiation received by a particular transceiver head is directed to the detector.

In a further embodiment the radiation directed to the detector is coherently mixed with radiation extracted from the laser source prior to detection by the detector. A person skilled in the art would appreciate that subsequent electrical mixing of the signal produced by the detector, so-called "beating down", may also be advantageous when there is a significant frequency difference between the return signal and the local oscillator signal.

In another embodiment, radiation received by the two or more transceivers is directed to two or more detectors. Two or more detectors should also be taken to include a detector having two or more detection elements.

Advantageously, the radiation directed to each of the two or more detectors is coherently mixed with radiation extracted from the laser source prior to detection by the detector.

Conveniently, the detectors are coupled to each transceiver by an optical fibre cable. This allows the detector to be located remotely to the transceiver, and a optical fibre link is provided to couple radiation between them.

Advantageously, the transceivers are monostatic; i.e. the transceiver has common transmit and receive optics. The transceivers may also be bistatic; i.e. the transceiver has separate transmit and receive optics.

Advantageously, the device has more than three, more than five or more than ten transceivers.

In a further embodiment, the transceivers are located remotely to the laser source. The transceivers may be located tens of meters, hundreds of meters or even kilometers from the laser source. The maximum length of optical fibre cable is limited only by the acceptable level of optical loss.

Conveniently, the laser source is a semiconductor laser or a semiconductor laser and an erbium doped amplifier arranged in a master oscillator power amplifier configuration. These laser sources meet the requirements of having a sufficiently long coherence length, and a low relative intensity noise (RIN).

Advantageously, the laser source outputs radiation with a wavelength between 1.4 µm and 1.6 µm.

In a further embodiment, the detected signals are processed to obtain speed information, such as the speed of particles in air to provide wind speed measurements. The laser source may also be frequency modulated so that the detected signals can be processed to provide range information. Vibrometric information may also be provided. A person skilled in the art would recognise the various processing techniques that are appropriate for the extraction of such information from the detected signals.

Conveniently, the apparatus used to process the detected signals is located remotely to the transceivers; for example the apparatus used to process the detected signals may be located substantially adjacent to the laser source.

According to a second aspect of the invention, a wind speed measurement system for use on an aircraft incorporates a device according to the first aspect of the invention, wherein the transceivers are located along the wings of the aircraft and are directed so as to measure the wind speed of probe volumes in front of the aircraft, and the measured wind speed information is used to adjust the configuration of the aircraft wings.

Aircraft wind gust sensors using a device according to the first aspect of the present invention can provide measurement of air flow at multiple points in front of the aircraft wings so that the wing shape (e.g. flap settings) can be automatically adjusted to optimise efficiency and ride quality. Also, measurement of the wind speed of a point from three different directions would provide three dimensional wind field information that could prove valuable when landing an aircraft on a ship. The present invention provides a practical and weight/cost effective way of performing such measurements.

According to a third aspect of this invention, a wind speed measurement system for ship landing applications incorporates a wind speed measurement device according to the first aspect of the invention that has at least three transceivers, wherein the transceivers are spatially separated and are adapted to measure the wind speed of a single probe volume; the measurement of the wind speed of a probe volume from three different directions permitting the three dimensional wind field vector for the probe volume to be ascertained.

In other words, measuring wind speed of the same probe volume from at least three different directions permits the wind speed of the probe volume in at least three different directions to ascertained. This allows the wind velocity for the probe volume to be calculated, which could prove advantageous for aircraft (including helicopters) landing on ships. The wind speed measurement system could be deployed on the aircraft, or on the ship itself.

According to a fourth aspect of the invention, a wind velocity measurement system for measuring wind strength in front of two or more wind turbines incorporates a wind speed measurement device according to the first aspect of the invention wherein the two or more transceiver heads are located on each wind turbine and the laser source is located in the base of one of the wind turbines.

A device according to the first aspect of the present invention can thus be used on wind farms to measure the wind strength in front of each wind turbine so that the various turbine parameters can be adjusted in response to the incident wind strength. The present invention provides a cost effective way of performing such measurements.

The invention will now be described, by way of example only, with reference to the following drawings in which.

Figure 1:
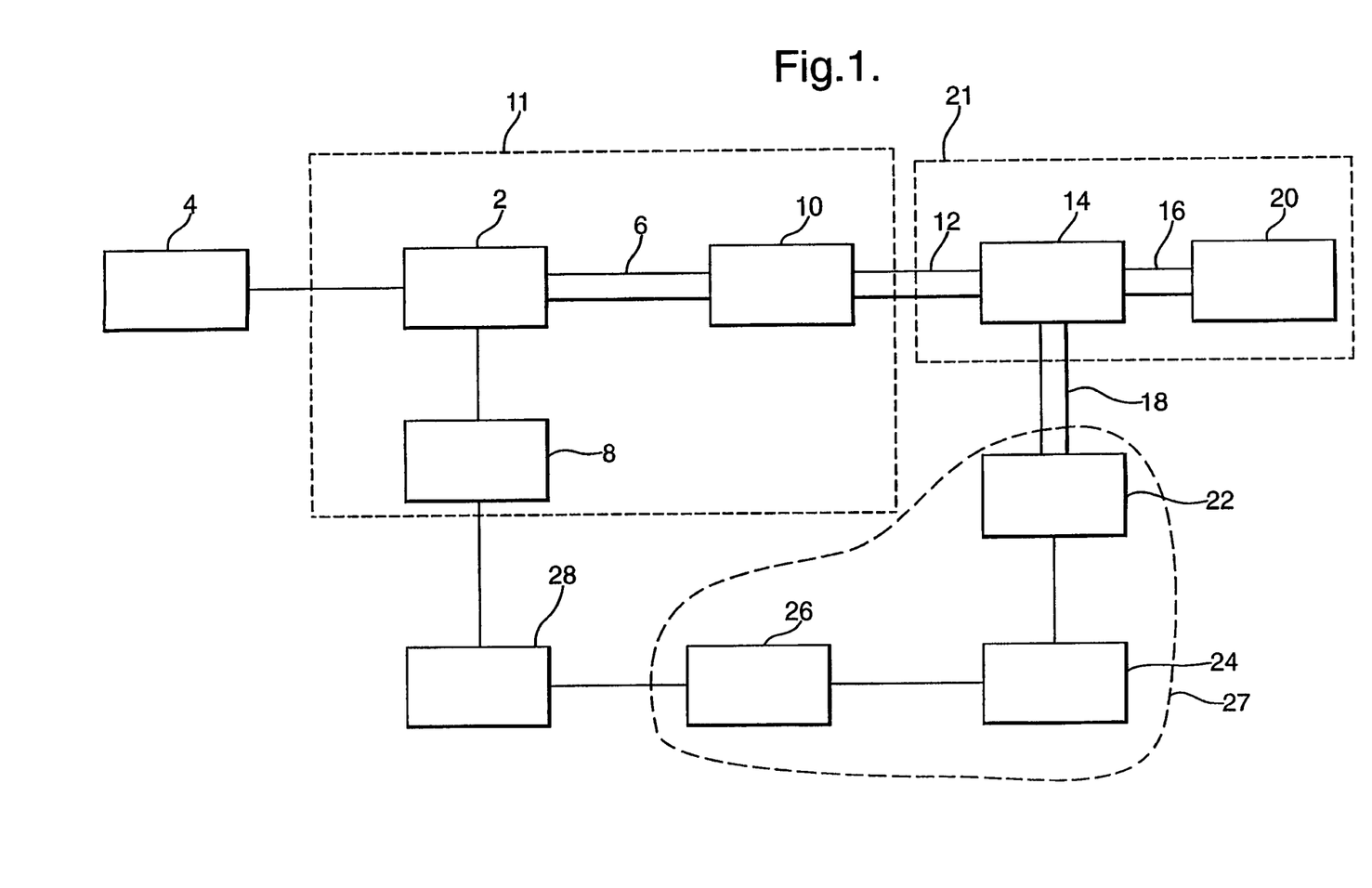
FIG. 1 shows a prior art Doppler CLR device.

Referring to FIG. 1, prior art mono-static CLR Doppler device of the type described in Karlsson et al, Applied Optics, Vol. 39, No. 21, 20 Jul. 2000, the contents of which are incorporated herein by reference thereto, is shown.

The CLR device comprises a distributed feedback (DFB) diode laser 2 that emits radiation at a wavelength of 1.55 μm, and a laser power supply 4. The output intensity of the DFB diode laser 2 can be frequency modulated by applying an electrical modulation signal from a waveform generator 8 to the laser; such frequency modulation is required for range measurements. The laser beam generated by the diode laser 2 is coupled into an optical fibre cable 6. The laser beam exits the fibre optic cable 6, and is amplified by an erbium doped amplifier 10. The arrangement of the diode laser 2, the laser power supply 4, the optical fibre cable 6 and the erbium doped amplifier 10 in a master oscillator power arrangement (MOPA) is hereinafter collectively termed a laser source 11.

The amplified laser beam is coupled, via a fibre optic cable 12, to a polarisation independent fibre-optic circulator 14. The fibre-optic circulator 14 comprises a plurality of discrete optical components (not shown). These optical components are arranged such that the amplified laser beam incident from optical fibre cable 12 is output to optical fibre cable 16. Any radiation incident on the fibre-optic circulator 14 from optical fibre 16 is also transmitted to the optical fibre 18.

A telescopic head 20 contains a doublet lens (not shown) which focuses the laser beam emerging from the end of the fibre optic cable 16 to a particular point. Movement of the end of the fibre optic cable relative to the doublet lens allows the transmitted laser beam to be focussed at various distances from the telescopic head. The transceiver head is mono-static; the doublet lens therefore also acts to focus received radiation such that it is coupled in to the optical fibre 16.

The local oscillator signal required for coherent detection is generated by Fresnel reflection from the end of the fibre optic cable 16 that is coupled to the telescopic head 20. All the other fibre ends used in the device (i.e. both ends of fibres 6, 12 and 18 and the end of fibre 16 which couples to the fibre-optic circulator 14) are angled so as to minimise reflections.

The telescopic head 20 and the fibre-optic circulator 14 thus form a transceiver 21. The laser beam input to the transceiver 21 via optical fibre 12 is transmitted to a remote point, and the radiation reflected from that point and received by the transceiver is output via optical fibre 18.

A detector unit 22 receives radiation from the optical fibre 18. The radiation incident on the detector unit 22 is a coherent mix of the signal received by the telescopic head 20 and the local oscillator signal derived from Fresnel reflection from the end of the fibre optic cable 16. The detector unit 22 comprises a InGaAs photodiode and a transimpedance amplifier (not shown).

The electrical signal generated by the detector unit 22 is passed through an anti-alias filter 24 before being converted to a digital electrical signal by an analogue-to-digital converter 26. Collectively the detector unit 22, anti-alias filter 24 and analogue-to-digital converter 26 are herein termed detection means 27. A personal computer 28 is used to analyse the digital electrical signal provided by the detection means 27, and is also used to control the modulation signal that is applied to the diode laser 2 by the waveform generator 8. A person skilled in the art would recognise that a surface acoustic wave (SAW) spectrum analyser could also be used to perform the necessary analysis of the electrical signal.

As described in more detail in Karlsson et al, control of the output laser beam, and analysis of the returned signal, can yield range or speed measurements. This includes measurements of wind speed in a particular probe volume. However, this prior art device is limited to measuring the range of a single point or the wind speed in one probe volume.

Figure 2:
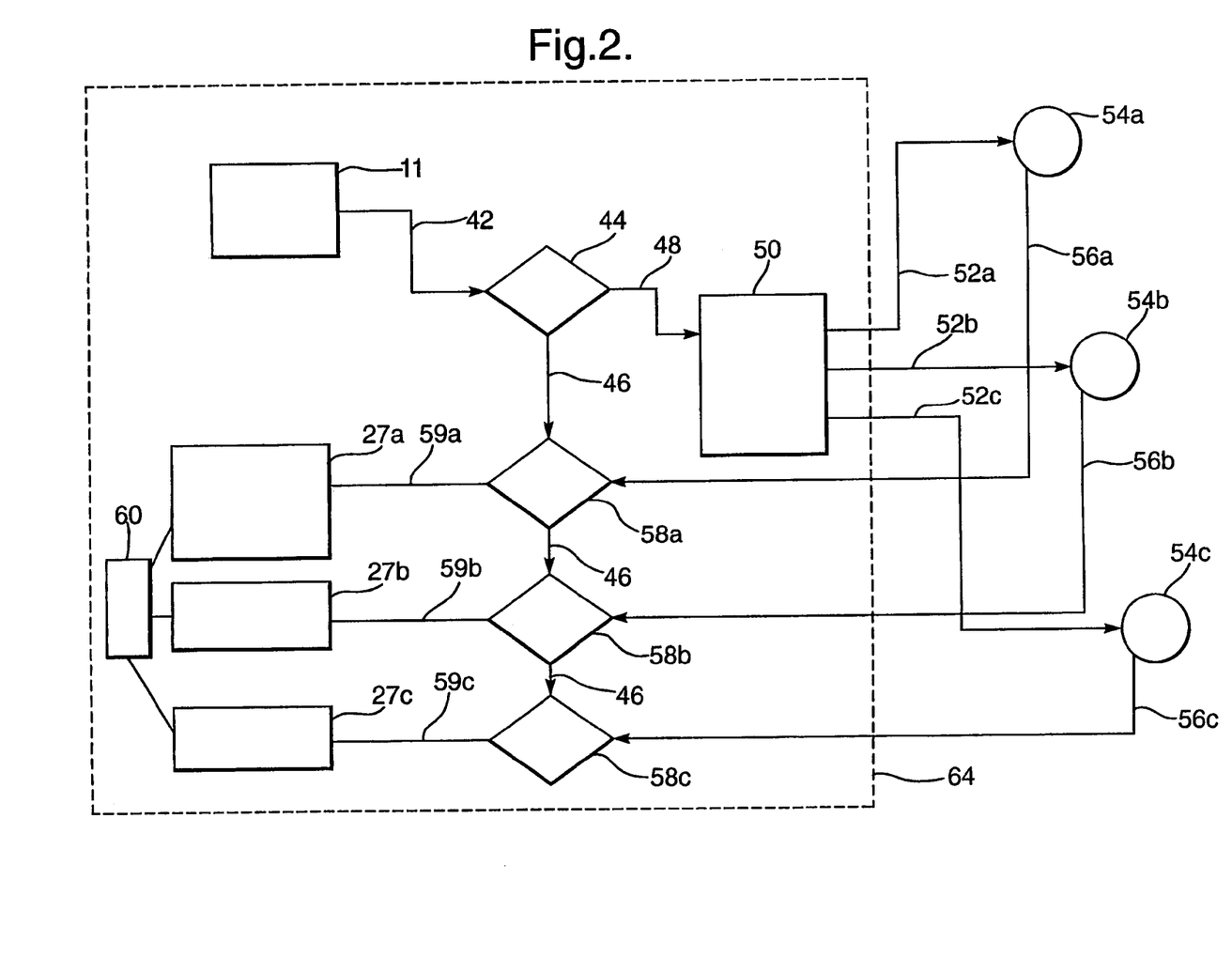
FIG. 2 shows a device according to the present invention.

Referring to FIG. 2, a CLR device of the present invention is shown. Elements of the device described with reference to FIG. 2 that are common to the description of FIG. 1 are given like reference numerals.

A laser source 11 emits a laser beam that is coupled into an optical fibre cable 42. A beam splitter 44 is provided and directs a small fraction of the laser power as a local oscillator signal to optical fibre cable 46, and the remaining optical power is directed in to optical fibre cable 48. A person skilled in the art would recognise that the optical power of the local oscillator signal would advantageously be adjusted to give optimised shot noise domination in the detector.

A three way beam splitter 50 equally divides the laser power incident from optical fibre cable 48 between the optical fibre cables 52a, 52b and 52c, which in turn are coupled to transceivers 54a, 54b and 54c. Each of the transceivers 54 transmit the laser radiation, and also output any received radiation (i.e. radiation reflected back to it from an object) to their respective optical fibre cables 56.

Optical mixers 58 coherently mix the received radiation of each of the optical fibre cables 56 with the local oscillator signal provided by the beam splitter 44. The resultant coherently mixed signals are output along optical fibre cables 59 to each of the respective detection means 27. A personal computer 60 processes the data provided by each of the detection means 27 generating range or speed data as required. The CLR device thus provides three simultaneous measurements of range and/or speed for the three transceivers; however this is at the cost of each transceiver requiring its own detection means 27.

The device of the type shown in FIG. 2 can be considered to have a central unit 64 and a plurality of transceivers 54 linked by the optical fibre cables 52 and 56. The length of the optical fibre cables 52 and 56 may be many ten's of meters, or even several kilometers, as required; the only limitation on the length of the cable is the optical loss which it introduces. The use of optical fibre cable allows the positioning of the transceivers at substantial distances from each other, and away from the central unit 64.

A person skilled in the art would also appreciate that the transmission of high power coherent laser light through long lengths of single-mode fibre (e.g the optical fibre cables 52) can lead to an increase in the noise levels arising from non-linear optics (NLO) mechanisms such as stimulated Brillouin scattering (SBS). NLO effects depend on fibre length, and a particular fibre will have an optical power threshold above which NLO noise starts to significantly effect device performance. More detail on NLO effects can be found elsewhere; for example see D Cotter, Electronics Letters 18 (12) 495–496 (1982).

It has been found that a typical optical power threshold for a standard single mode fibre is around 1 W with a 125 m length of optical fibre, and approximately 80 mW with a 4 km length of optical fibre cable. A person skilled in the art would however appreciate the various ways in which the NLO effects could be mitigated. For example, the SBS mechanism could be suppressed by reducing feedback in the transmit fibre using optical isolators (not shown) located at regular intervals along the transmit fibre. The required spacing of the optical isolators would depend upon the transmitted optical power.

Alternatively, NLO effects could be reduced by locating an optical amplifier, such as an Erbium doped fibre amplifier (EDFA), close to each transceiver or cluster of transceivers thus ensuring only low-power transmission along the main transmit fibre. The threshold for the SBS process may also be increased by using single-mode fibres that have an increased mode area, such as photonic crystal fibre (PCF). Further methods (e.g. see T Imai et al, Elec. & Comm. in Japan 78 (11) 22–31 (1995)) include using fibres that enlarge the SBS gain bandwidth by applying a varying strain distribution along the length of the fibre, or by shifting the frequency of the SBS spectrum by varying the core dopant concentration along the length of the fibre.

Furthermore, it should be recognised that the function of coherently mixing the local oscillator optical beam with the received optical beams need not be performed in the central unit 64. For example, the coherent optical mixing could be performed using fibre end reflections in the transceiver itself as described above with reference to FIG. 1.

It should also be noted that although only optical mixing is performed in the device described with reference to FIG. 2, subsequent mixing could also be performed in the electronic domain. A person skilled in the art would appreciate that subsequent electrical mixing is generally required when there is a significant frequency difference between the return signal and the local oscillator signal. This large frequency difference may occur when high speeds are measured. Alternatively, a large frequency shift between the local oscillator and return signal may be introduced by inclusion of an acousto-optic modulator (not shown) so that the Doppler shift measurements can distinguish relative motion towards and away from the transceiver.

The embodiment described with reference to FIG. 2, is particularly suited to situations where plenty of laser output power is available and "sharing" of the laser power is appropriate. Although a 1×3 split is shown, the only limit on the degree of splitting (and hence the number of transceivers that can be used in the device) is the optical power needed to make the required measurements.

A person skilled in the art would also recognise that optical isolators (not shown) could be included in any portion of the transmit and/or receive optical fibre cables as required. The inclusion of optical isolators would eliminate noise brought about by interference of the local oscillator signal with internal reflections in addition to reducing NLO effects as described above.

Figure 3:
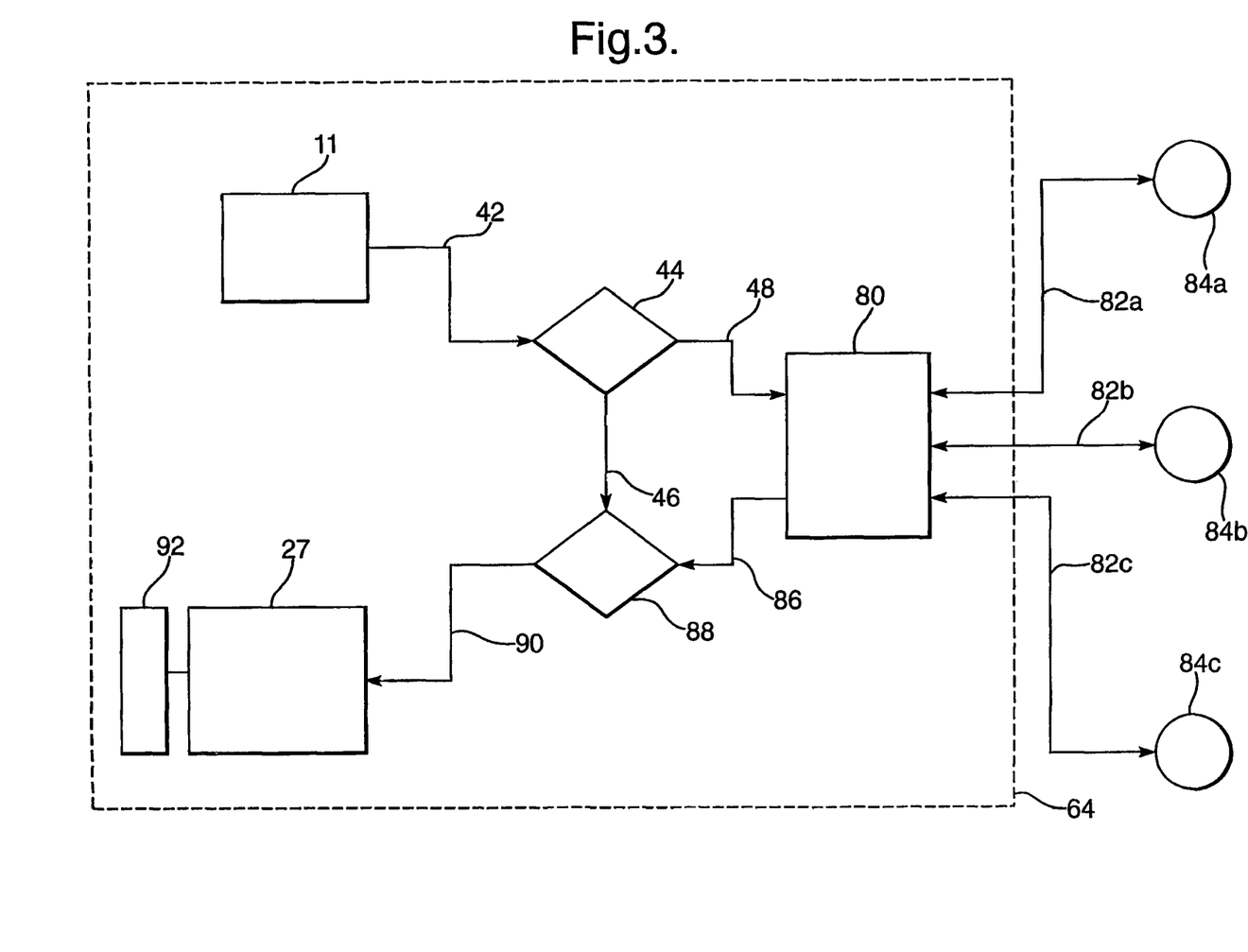
FIG. 3 shows an alternative device according to the present invention.

Referring to FIG. 3, a second example CLR device of the present invention is shown. Elements which are like those shown with reference to FIGS. 1 and 2 above have been assigned like reference numerals.

A laser source 11 emits a laser beam that is coupled into an optical fibre cable 42. A beam splitter 44 is provided and directs a fraction of the laser power as a local oscillator signal to optical fibre cable 46, and the remaining optical power is coupled to the optical fibre cable 48.

An optical switch 80 receives radiation from optical fibre cable 48, and directs that radiation to any one of the transceivers 84*a*, 84*b* and 84*c* via the respective optical fibre cables 82*a*, 82*b* or 82*c*. Each transceiver 84 also couples any radiation received (i.e. any returned radiation) back into the relevant optical fibre cables 82, and the optical switch 80 then directs this radiation from the selected optical fibre cable 82 to the optical fibre cable 86.

The radiation fed into optical fibre 86 is coherently mixed, in a mixer 88, with the local oscillator signal provided by the beam splitter 44. The coherently mixed radiation is routed through optical fibre cable 90 to the detection means 27. Range and speed information, as required, can then be calculated by the personal computer 92 for the particular selected transceiver.

The optical switch 80 thus has the effect of routing optical power to one transceiver (e.g. transceiver 84*b*), and routing the return signal received by that transceiver (i.e. transceiver 84*b*) to the detection means 27 thereby providing range or speed information. By switching the optical switch, the transceivers can be sequentially activated, allowing quasi-simultaneous measurements to be performed.

The optical switch 80 could be any device that is capable of routing optical signals without any significant loss of the coherence information. Such switches are commonly used in the field of telecommunications.

For example, the switch may be a wavelength division multiplexer (WDM) or more particularly a dense wavelength division multiplexer (DWDM). A DWDM will route an incident optical beam to any one of N output channels; the wavelength of the incident optical beam determining which of the output channels is selected. In this manner, the laser source of the CLR could be tuned to output slightly different wavelengths of light, thereby causing the DWDM to switch the laser power to a particular transceiver.

Alternatively, a duplex optical switch could be provided that consists of a set of two common input fibres (i.e. for a transmit signal and a receive signal) that move as a group (i.e. synchronously) into alignment with a corresponding set of two output fibres.

The switching rate between transceivers is chosen to ensure the observed phenomena show time evolution at a rate slower than the switching cycle timescale. For example, a time of 10–20 ms is often sufficient for a single reliable wind measurement to be carried out. Hence, for number of transceivers N~10, a full measurement cycle can be carried out over a period 0.1–0.2 seconds. A wind field would not normally be expected to evolve significantly over this timescale.

The simple calculation described above has ignored the switching time of the optical switch which, for optical fibre duplex switches, is of order 10–200 ms. Therefore, the measurement timescales are slightly increased when using optical fibre duplex switches. However, faster switching times can be achieved using DWDM technology combined with rapid laser tuning.

A device of the type shown in FIG. 3 can be considered to have a central unit 64 and a plurality of transceivers 84 linked by optical fibre cables 82. The length of the optical fibre cables 82 may be many ten's of meters, or even several kilometers, as required; the only limitation on the length of the cable being the optical loss which it introduces. The use of optical fibre cable allows the positioning of the transceivers at substantial distances from each other, and from the central unit 64.

Referring to FIG. 4, three alternative embodiments of the present invention are shown which incorporate bistatic transceivers 21 of the type described with reference to FIG. 1.

Figure 4A:
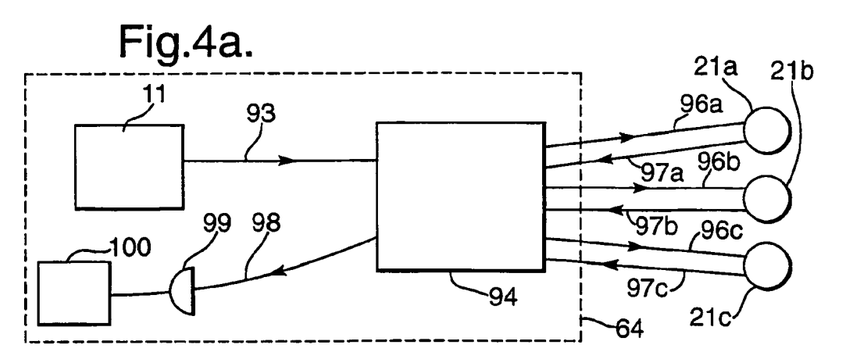
FIG. 4 shows three additional devices according to the present invention.

The device of FIG. 4*a* comprises a central unit 64. The central unit 64 has a laser source 11, the output of which is fed through an optical fibre cable 93 to an optical switch 94.

The optical switch 94 directs radiation from the laser source 11 to any one of the three transceivers 21 through the appropriate optical fibre cable 96, thereby allowing any one of the transceivers 21 to be activated.

The optical switch 94 also functions so as to route radiation received by the activated transceiver 21, which will have mixed with a local oscillator signal within the transceiver 21, to a detector 99. The electrical signal produced by the detector 99 is analysed by data analysis means 100 to extract the required range, speed or vibrometric information. The optical switch 94 may be a duplex optical fibre switch, or a pair of DWDMs, of the type described with reference to FIGS. 2 and 3 above.

Figure 4B:
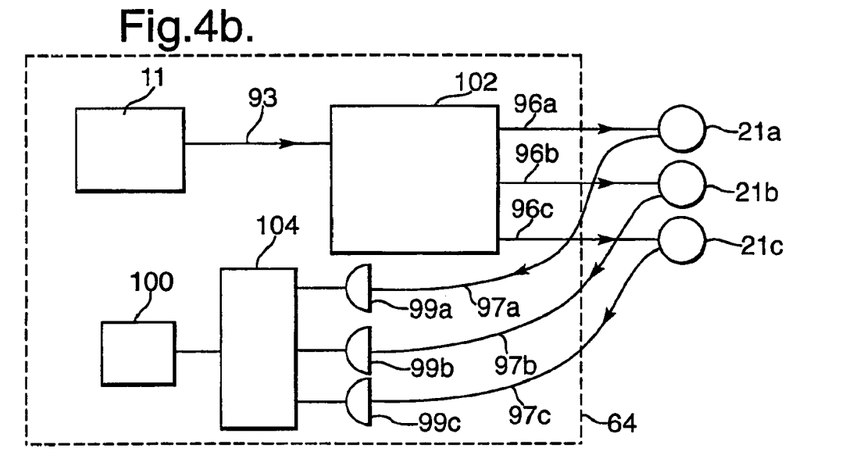

The device shown in FIG. 4b comprises a central unit 64. The central unit 64 has a laser source 11, the output of which is fed through an optical fibre cable 93 to an optical switch 102. The optical switch 102 directs radiation from the laser source 11 to any one of the three transceivers 21 through the appropriate optical fibre cable 96 thereby allowing any one of the transceivers 21 to be activated.

Radiation received by each of the activated transceivers 21, which will have mixed with a local oscillator signal within the transceiver 21, is directed to the detectors 99 via optical fibre cables 97. An electrical switch 104 directs the electrical signal from one of the detectors 99 to the data analysis means 100 which extracts the required range or speed information for the activated transceiver.

The device shown in FIG. 4c again comprises a central unit 64. The central unit 64 has a laser source 11, the output of which is fed through an optical fibre cable 93 to an optical switch 102. The optical switch 102 directs radiation from the laser source 11 to any one of the three transceivers 21 through the appropriate optical fibre cable 96, thereby allowing any one of the transceivers 21 to be activated.

Figure 4C:
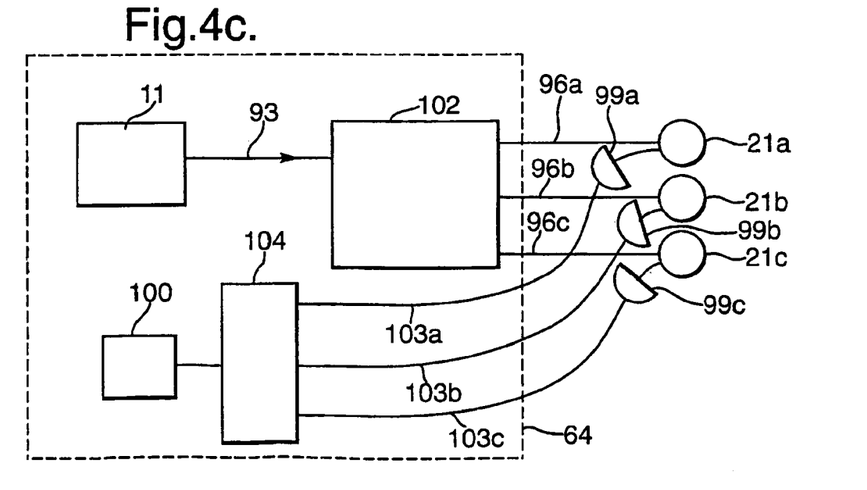

Radiation received by each of the activated transceivers 21, which will have mixed with a local oscillator signal within the transceiver 21, is directed to detectors 99. The detectors 99 are located in the vicinity of the transceivers 21, and the electrical signals produced are sent through electrical cables to the electrical switch 104. The electrical switch 104 directs the electrical signal from one of the detectors 99 to the data analysis means 100 which extracts the required range or speed information.

The devices shown in FIG. 4 allow the transceivers 21 to be located remotely to the central unit 64. The transceivers can be connected optically (as in FIGS. 4a and 4b) to the central unit 64 using optical fibres 96 and 97. This is advantageous when electrical fields are present which could interfere with the transmission of electrical signals. Alternatively, as shown in FIG. 4c, the connection to the laser source can be via a optical fibre 96 whilst the received signal is carried electrically to the central unit 64 through the cable 103. This is advantageous when the received signal intensity is low, and the optical loss and possible noise introduced by an optical fibre connection is thus undesirable.

Referring to FIG. 5, various uses of devices according to the present invention are illustrated.

Figure 5A:
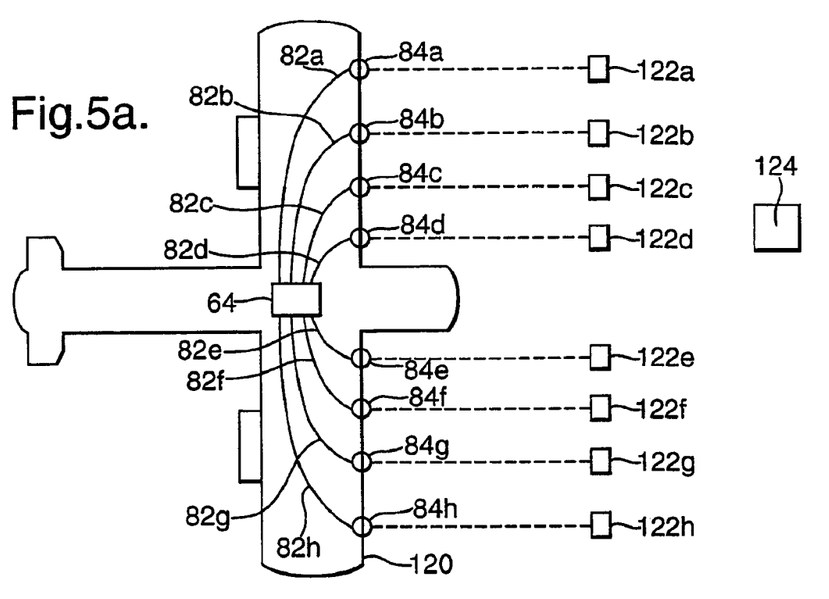
FIG. 5 shows uses of devices according to the present invention.

FIG. 5a, shows a device of the type described with reference to FIG. 3 deployed on an aircraft 120. The central unit 64 of the CLR may be positioned anywhere within the aircraft; the transceivers 84 being linked to the central unit 64 via optical fibre cables 82. The transceivers can thus be deployed in positions where prior art CLR devices could not; for example in the wing tips.

Each transceiver 84 is configured to allow acquisition of wind speed information from a probe volume 122 approximately two hundred meters in front of the aircraft. The central unit 64 determines the wind speed of each probe volume 122 sequentially, thereby building up a wind field map that allows the wing shape of the aircraft (e.g. the flaps) to be adjusted accordingly in order to increase fuel efficiency and improve ride quality. Altering wing shape in response to gust measurements, which may be termed adaptive winging, could be incorporated in the next generation of airliners and may improve airline safety by allowing approaching air turbulence to be detected.

The CLR device, when deployed on an aircraft, could also be used to measure the 3-D wind field of a single point in space. For example, in the configuration shown in FIG. 4a, the transceivers 84a, 84d and 84h could all be focussed on to a single probe volume (e.g. probe volume 124). The lateral displacement of the three transceivers 84a, 84d and 84h along the aircraft wing enables line of sight wind measurements to be made from three separate directions. This enables three components of wind speed to be determined from three different directions thereby providing a 3-D wind field measurement of probe volume 124 to be ascertained. Such 3-D wind field information can be advantageous in many situations; for example ship-landing applications. In ship-landing applications, the CLR device could also be located on the ship; the wind field information being communicated to the aeroplane or helicopter as required.

Figure 5B:
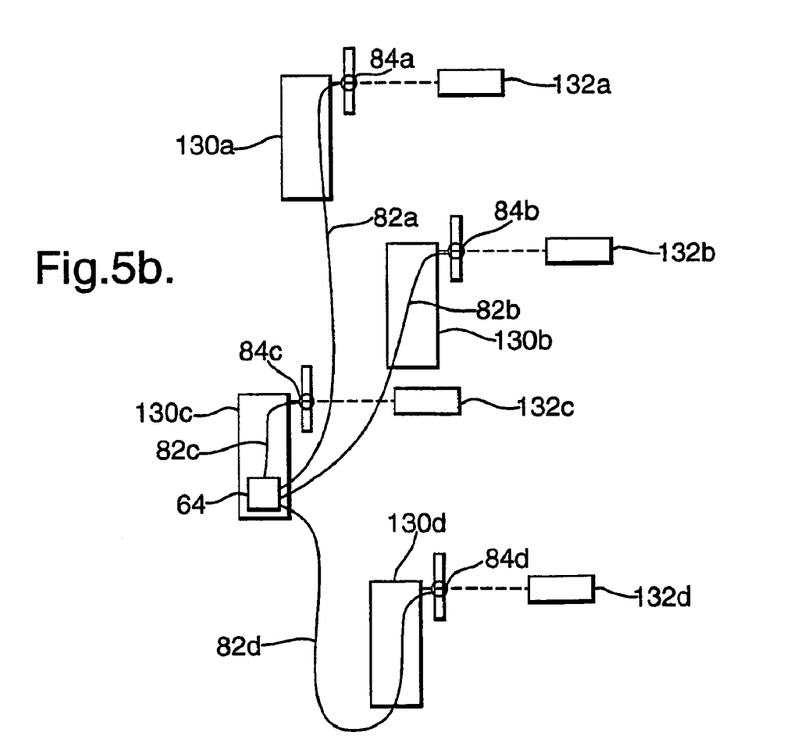

FIG. 5b illustrates a device of the type described with reference to FIG. 3 deployed to make wind speed measurements on a wind farm that comprises multiple wind turbines 130.

The central unit 64 of the CLR may be positioned within one of the wind turbines (e.g. wind turbine 130c in FIG. 4b), and the transceivers 84 are linked to the central unit 64 via optical fibre cables 82. Each transceiver 84 is mounted on each wind turbine 130, and detects the wind speed in probe volumes 132 that are a certain distance in front of each wind turbine. This allows the wind turbines to react to the wind strength they are about to encounter, thereby preventing turbine damage and optimising power generation efficiency.

Although the device described with reference to FIG. 3 is shown in the various applications described with respect to FIG. 5, this should in no way be seen as limiting. Any device based on those described with reference to FIGS. 2, 3 or 4 could be used for the applications described with reference to FIG. 5. Similarly, a person skilled in the art would recognise CLR devices of the present invention could be applied to situations other than those described with reference to FIG. 5.

The invention claimed is:

1. A wind velocity measurement device comprising
   a laser source, and
   two or more transceivers;
   and at least one detector,
   wherein radiation received by said two or more transceivers is coherently mixed with radiation extracted from the laser source prior to detection by the at least one detector,
   characterised in that the two or more transceivers are optically connected to the laser source by optical fibre cables,
   the optical fibre cables connecting the laser source and the two or more transceivers are routed through a first optical routing means; and wherein the wind velocity measurement device is arranged to measure the wind speed in front of two or more wind turbines wherein one of said two or more transceivers is located in or each of said two or more wind turbines.

2. A device as claimed in claim 1 wherein the first optical routing means is a multi-way optical splitter.

3. A device as claimed in claim 1 wherein the first optical routing means is an optical switch.

4. A device as claimed in claim 3 wherein the optical switch is a wavelength division multiplexer (WDM), the WDM being arranged so as to direct laser radiation of different wavelengths to different transceivers.

5. A device as claimed in claim 3 wherein the optical switch is a fibre switch that is controlled to direct laser radiation to a particular transceiver head.

6. A device as claimed in claim 1 wherein a single detector is provided, and the radiation received by the two or more transceivers is optically coupled to the detector by optical fibre cables via a second optical routing means.

7. A device as claimed in claim 6 wherein the second optical routing means is an optical switch.

8. A device as claimed in claim 7 wherein the optical switch is a WDM, and the frequency of the laser is alterable such that radiation received by a particular transceiver head is directed to the detector.

9. A device as claimed in claim 7 wherein the optical switch is a fibre switch that is controlled such that radiation received by a particular transceiver head is directed to the detector.

10. A device as claimed in claim 1 wherein radiation received by the two or more transceivers is directed to two or more detectors.

11. A device as claimed in claim 9 wherein the detectors are coupled to each transceiver by an optical fibre cable.

12. A device as claimed in claim 1 wherein the transceivers are monostatic.

13. A device as claimed in claim 1 wherein the transceivers are bistatic.

14. A device as claimed in claim 1 having more than three transceivers.

15. A device as claimed in claim 1 having more than five transceivers.

16. A device as claimed in claim 1 having more than ten transceivers.

17. A device as claimed in claim 1 wherein the transceivers are located remotely to the laser source.

18. A device a claimed in claim 1 wherein the laser source is a semiconductor laser.

19. A device as claimed in claim 1 wherein the laser source is a semiconductor laser and an erbium doped amplifier arranged in a matter oscillator power amplifier configuration.

20. A device as claimed in claim 1 wherein the laser source outputs radiation with a wavelength between 1.4 µm and 1.6 µm.

21. A device as claimed in claim 1 wherein the laser source is frequency modulated and the detected signals are processed to provide range information.

22. A device as claimed in claim 1 wherein the detected signals are processed to provide vibrometric information.

23. A device as claimed in claim 1 wherein the apparatus used to process the detected signals is located remotely to the transceivers.

24. A device as claimed in claim 1 wherein the apparatus used to process the detected signals is located substantially adjacent to the laser source.

25. A wind speed measurement system for use on an aircraft incorporating a device as claimed in claim 1 wherein the transceivers are located along the wings of the aircraft and are directed so as to measure the wind speed of probe volumes in front of the aircraft, the measured wind speed information being used to adjust the configuration of the aircraft wings.

26. A wind speed measurement system for use in aircraft landing applications incorporating a device as claimed in claim 1 that has at least three transceivers, wherein the transceivers are spatially separated and are adapted to measure the wind speed of a single probe volume, the measurement of the wind speed of a probe volume from three different directions permitting the three dimensional wind field vector for the probe volume to be ascertained.

27. A wind velocity measurement for measuring wind strength in front of two or more wind turbines incorporating a device comprising:
a laser source;
two or more transceivers;
and at least one detector, wherein radiation received by said two or more transceivers is coherently mixed with radiation extracted from the laser source prior to detection by the at least one detector, characterised in that the two or more transceivers are optically connected to the laser source by optical fibre cables, the optical fibre cables connecting the laser source and the two or more transceivers are routed through a first optical routing means wherein the two or more transceivers are located in each wind turbine and the laser source is located in the base of one of the wind turbines and wherein the detected signals are processed to obtain speed information and wherein the speed of particles in air is determined to provide wind speed measurements.

28. A device according to claim 1 wherein the optical fibre cable connecting the two or more transceivers and the laser source is several kilometers in length.

29. A device according to claim 28 wherein at least one optical isolator is located along the optical fibre.

30. A coherent laser radar device comprising:
a laser source;
two or more transceivers; and
at least one detector wherein radiation received by said two or more transceivers is coherently mixed with radiation extracted from the laser source prior to detection by at least one detector, wherein the two or more transceivers are optically connected to the laser source by optical fibre cables, and wherein the optical fibre cables connecting the laser source and the two or more transceivers are routed through a wavelength division multiplexer (WDM), the WDM being arranged so as to direct laser radiation of different wavelength to different transceivers.

* * * * *